Figure 6:
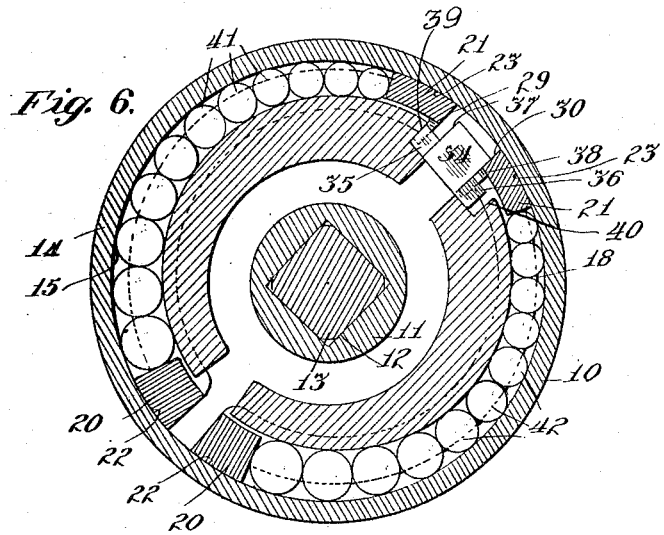

C. W. TAYLOR.
POWER TRANSMISSION MECHANISM.
APPLICATION FILED JULY 17, 1912.
1,067,078.
Patented July 8, 1913.
3 SHEETS—SHEET 1.
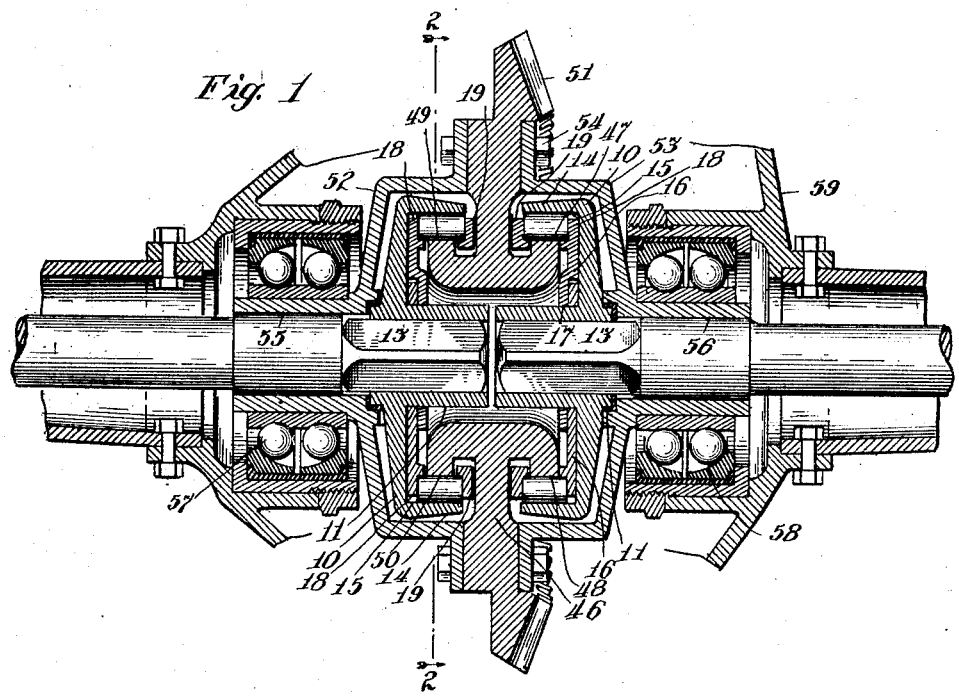
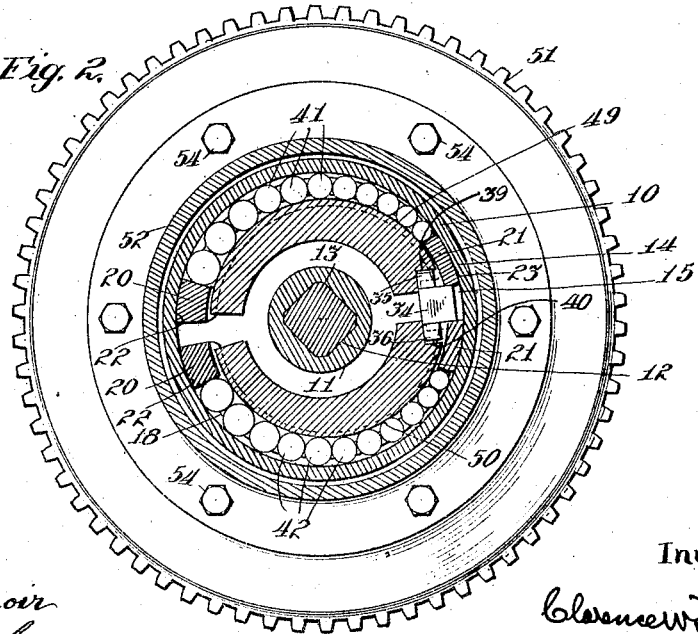
Witnesses
Inventor.

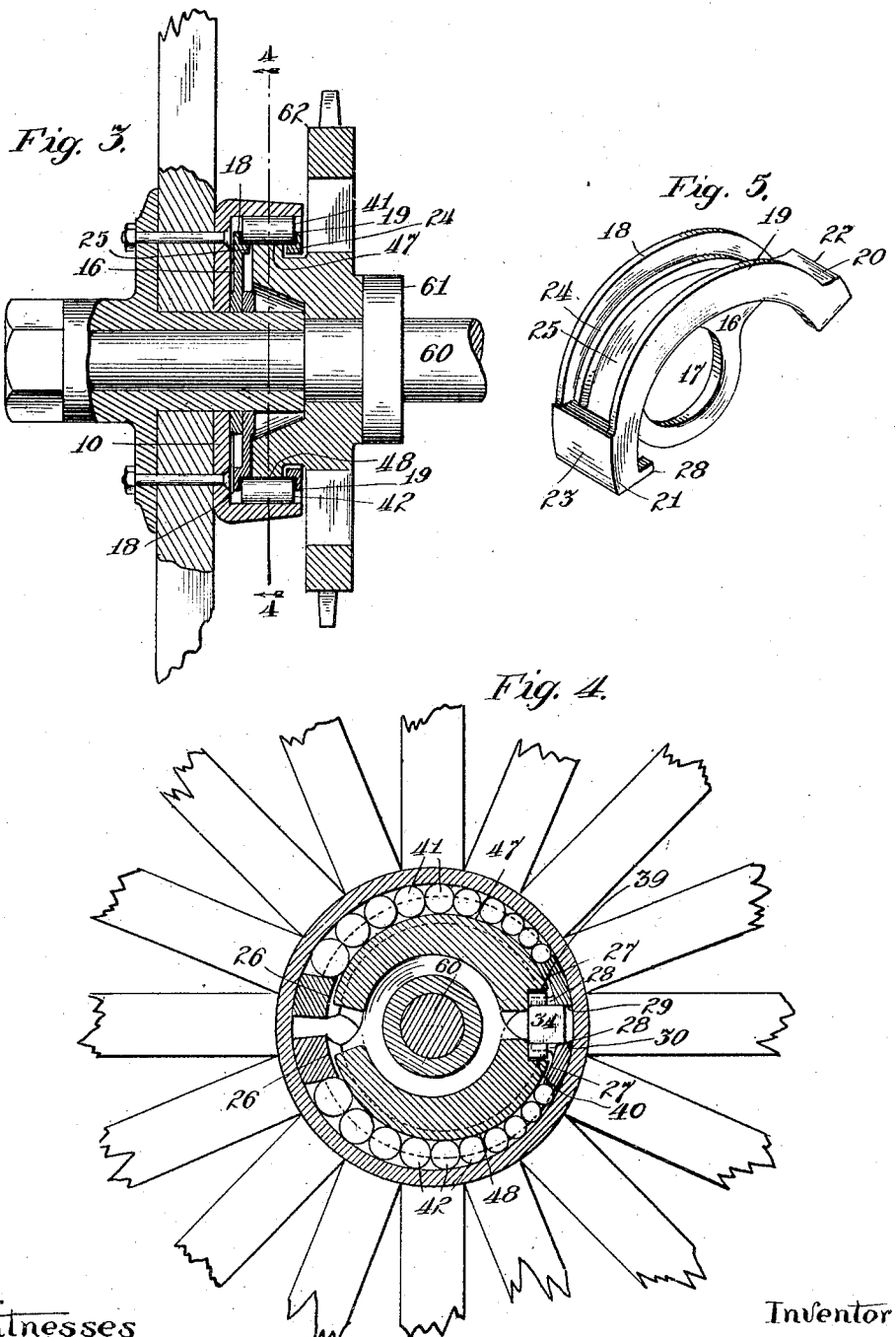

C. W. TAYLOR.
POWER TRANSMISSION MECHANISM.
APPLICATION FILED JULY 17, 1912.

1,067,078.

Patented July 8, 1913.

3 SHEETS—SHEET 3.

Witnesses
Milton Lenoir
L. B. Graham

Inventor.
Clarence W. Taylor

UNITED STATES PATENT OFFICE.

CLARENCE W. TAYLOR, OF OAK PARK, ILLINOIS, ASSIGNOR TO FRANK M. LEWIS, OF CHICAGO, ILLINOIS.

POWER-TRANSMISSION MECHANISM.

1,067,078.  Specification of Letters Patent.  Patented July 8, 1913.

Application filed July 17, 1912. Serial No. 710,083.

*To all whom it may concern:*

Be it known that I, CLARENCE W. TAYLOR, a citizen of the United States, residing at Oak Park, in the county of Cook and State of Illinois, have invented certain new and useful Improvements in Power-Transmission Mechanism, of which the following is a specification.

My invention relates to improvements in power transmission mechanism, and the objects of my improvement are: first, to provide a construction whereby to actuate a driven member in either direction and to permit the driven member to independently revolve faster than the driving member in either direction; second, to afford quick acting means between the driving and driven parts in machinery of any type in which it is desirable to have automatic release and independent movement of the driven part in one or more directions; third, to produce a construction adapted to occupy limited space and particularly when employed in motor vehicles to be readily disposed in the space provided for the conventional differential mechanism on the market; fourth, to provide rollers or balls or separate interfering means in the plan of the customary gear teeth combined with a cam surface to insure instant release instead of two cam surfaces wedging together. By this construction only slight movement of the driving cam, and only a like movement of the rollers on the driving cam is required to effect a power transmission engagement with the driven member or a release from such engagement; and, fifth, a very important object of my present invention is the provision of carriers, for the respective sets of rollers, capable of a relative movement and having means formed to permit and to limit their relative movement in one direction and means adapted to force the carriers apart in the opposite direction to prevent locking of one set of rollers against the other with the driven member.

A further object of my present invention is to produce a construction whereby a roller or rollers supported by a carrier in frictional contact with a driven member are wedged radially into grip by an inclined surface of a driver.

A still further object of my improvement is a construction whereby to restrain the carrier from movement when a vehicle is at rest until the driver has forced the rollers into grip with the driven member.

With the foregoing and other objects in view, my invention consists in the novel features and in the novel combination and arrangement of parts hereinafter fully described, illustrated in the accompanying drawings forming a part of this specification, and particularly pointed out in the claims hereunto appended; it being understood that changes, variations and modifications in the details of the invention within the scope of the claims, may be resorted to without departing from the spirit or sacrificing any of the advantages thereof.

Figure 8:
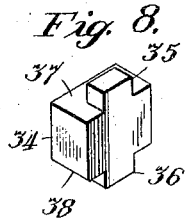
Figure 7:
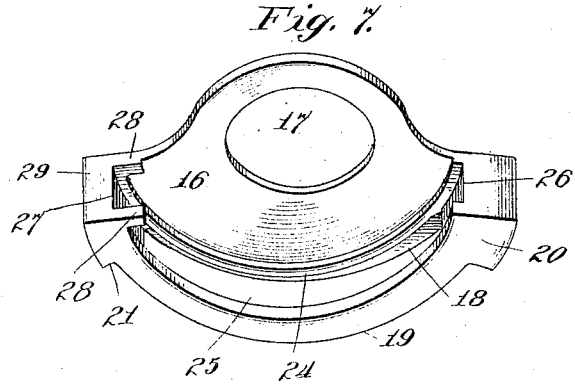

Figure 1 is a longitudinal central section of my improvement applied to the inner ends of a divided rear axle of a motor vehicle. Fig. 2 is a cross section on line 2—2 in Fig. 1. Fig. 3 is a vertical central section of a vehicle wheel. Fig. 4 is a section on line 4—4 in Fig. 3. Fig. 5 is a perspective view of a carrier. Fig. 6 is an enlarged cross section on line 2—2 in Fig. 1. Fig. 7 is a perspective view of a carrier. Fig. 8 is a perspective view of what is termed a spreader.

Similar numerals refer to similar parts throughout the several views.

One embodiment of my invention as applied to a motor vehicle is illustrated in the drawings and set forth in this specification.

Referring to the drawings by reference numerals, 10 denotes a driven member having an inwardly projecting hub portion 11 with a squared opening 12 therethrough to receive the squared end 13 of the shaft or axle. The internal flange 14 has a grip surface 15 for engagement with the rollers and the travel of the friction faces hereinafter more fully described.

For the purpose, among other things, of supporting rollers, balls or other suitable interfering means in operation to a driven member I have constructed what is termed carriers 16 having opening 17 to receive the hub 11 and rotate thereon. Peripheral lateral flanges 18, 19 terminate in end abutments 20, 21, preferably formed for strength, and having circumferential friction faces 22, 23, adapted for frictional contact with the internal annular face 15 of the driven member 10. Each carrier is provided with an inclined cavity 24 to receive a series of rollers of graduated sizes hereinafter more fully set forth. There is formed in each carrier a radial slot 25 for travel of a cam which will be more particularly described. A groove or recess 26 is formed in the inner wall of the end abutment 20, and a similar recess 27 is formed in abutment 21. Radial fingers 28 are provided on one end of each carrier.

The numerals 29 and 30 designate opposing faces of the respective carriers.

For the purpose of fixing the limit of movement of the faces 29 and 30 of the carriers toward each other, a block or plug 34 is made of suitable dimensions and disposed between the faces 29 and 30. For the purpose of moving the faces 29 and 30, and therefore, the carriers farther apart, studs or projections 35 and 36 are found on opposite ends of the block 34, as will be described, affording means to further separate the ends of the respective carriers and thus force the carrier farther down on the cam surface. Notch-walls 39 and 40 of the cams 47, 48, 49, 50 limit the movement of the block 34. The faces 37 and 38 are adapted to contact with the faces 29 and 30 of the carriers.

Series of rollers, 41 and 42 graduated in sizes, are supported by the respective carriers which are normally in contact with the driven member.

In the Figs. 1, 2, 3 and 4 of the drawings the carriers and their rollers or balls are at neutral positions. The rollers are in contact with the driven member, but not in grip relation thereto.

A driver 46 in Fig. 1, and 62 in Fig. 3 carries cams 47 and 48 in Figs. 3 and 4, and 49 and 50 in Figs. 1 and 2, integral with or attached to the driver. These cams are oppositely disposed as are the series of graduated rollers or balls which operate thereupon for wedging action of the cams against the rollers to wedge them into power transmitting engagement with the driven member.

51 designates a bevel gear wheel to mesh with the usual pinion (not shown).

52 and 53 indicate opposite parts of a rotatable housing bolted together at 54 and having hub portions 55 and 56 with bearings 57 and 58 of a non-rotatable housing 59.

In Figs. 3 and 4 are shown slight modifications of my invention which adapts it to a wheel of a vehicle. The shaft 60 has a collar 61 fixed thereto, and instead of a bevel gear wheel, a sprocket wheel 62 is provided suitable for a chain drive.

The separator or block 34 performs two functions, to limit the approach of the adjacent ends of the carriers, and to separate the adjacent ends and move one of the carriers farther down the cam surface when one of its end studs interferes with a cam against which it is drawn by friction of the carriers with the driven member. Preferably the cams are in fixed relation to each other, and the respective carriers are mounted for relative movement. Preferably a series of rollers or balls graduated in sizes are employed with a cam surface and a carrier is provided for each series or set of rollers. Frictional contact of the carriers with the driven member effects a drag or retardation of the carriers until the driven member and carriers and the driver rotate together.

When the speed of the driven shaft exceeds the speed of the driver and runs ahead, frictional contact with the driven member causes the carriers to move faster than the cams of the driver until the separator 34 strikes against a cam when the faces 29 and 30 of the ends 22, 21, of the carriers are forced into the position shown in Fig. 6, and the series of rollers 42 prevented from moving up on the cam surface far enough for grip or locked engagement of the rollers 42 with the driven member and vice versa.

Means to spread the carriers farther apart and means to permit limited relative movement of the respective carriers are important features of my present invention.

The employment of rollers upon a cam surface has been found to give quick and efficient results and obviates long movement and difficult release, instant engagement and release being desirable in mechanism of this class.

In operation when the driver is caused to be rotated in either direction one of the cams wedges a series of rollers into grip with driven member and rotates therewith. When one wheel of the motor vehicle describes a relatively longer radius curve when turning a corner, the driven member will rotate at a greater speed than the driver and thus disengage from the cam and the friction of the carriers with the driven member will move the carriers until the separator or spreader is operated to push the previously idle set of rollers farther down the cam and thus prevent a grip against rotation of the driven member and vice versa.

Having thus fully described my invention, what I claim as new, and desire to secure by Letters Patent, is—

1. In power transmission mechanism, a driven member, a double cam with faces oppositely positioned, a plurality of series of graduated rollers, a carrier for each series of rollers, and means to actuate the double cam in either direction for wedging one of said series of rollers at a time into grip with the driven member.

2. In power transmission mechanism, the combination of independent shafts and a driven member fixed to each shaft, with a plurality of double cams with faces oppositely positioned, a plurality of series of graduated rollers for each double cam, carriers for each series of rollers, and means to actuate the double cams in either direction for wedging one of said series of rollers at a time into grip with each driven member.

3. In power transmission mechanism, a plurality of carriers mounted for relative movement and, a separator positioned between opposing ends of the carrier to increase the distance between said ends of said carriers 4. In power transmission mechanism, driving and driven members, a plurality of series of rollers of graduated sizes, a carrier for each series of rollers, said carriers being in frictional contact with one of said members, and a double cam operable by one of said members and having inclined faces contiguous to the respective series of rollers.

5. In a power transmission mechanism, a driven member, carriers capable of limited movement relative to each other, a series of rollers of graduated sizes oppositely positioned, each carrier being in frictional contact with the driven member, and oppositely inclined cams each having a face in contact with a series of said rollers.

6. In power transmission mechanism, a driven member, a carrier in frictional relation to the driven member, a series of graduated rollers or balls supported by the carrier and a cam to wedge the rollers or balls into grip with the driven member.

7. In power transmission mechanism, a driven member, a plurality of carriers in frictional relation to the driven member, means to limit relative movement of the carriers in one direction, a series of graduated rollers supported by each carrier, and means to wedge the rollers into power transmission relation to the driven member.

8. In power transmission mechanism, a driven member, a plurality of carriers in frictional relation to the driven member, a separator, a series of graduated rollers supported by each carrier, and a cam contiguous to each of said series of rollers for instant engagement of the rollers with and release from the driven member.

9. In power transmission mechanism, the combination with independent shafts, a driven member fixed to each shaft, of a plurality of carriers in frictional relation to each driven member, a series of graduated rollers supported by each carrier, and cams contiguous to the respective series of rollers for wedging the rollers into grip with the driven member.

10. In a differential mechanism, the combination with independent shafts, a driven member fixed to each shaft, of a plurality of carriers disposed in frictional relation to the respective driven members, a series of graduated rollers supported by each carrier, means to limit relative movement of each carrier, and cams contiguous to the respective series of rollers for wedging the rollers into grip with the driven member.

In testimony whereof, I affix my signature in the presence of two witnesses.

CLARENCE W. TAYLOR. [L. S.]

Witnesses:
 SCOTT M. HOGAN,
 JAMES A. DILLON.